(12) United States Patent
Herring et al.

(10) Patent No.: US 8,800,872 B2
(45) Date of Patent: Aug. 12, 2014

(54) MULTI-MODE COMPUTING SYSTEMS FOR POINT OF SALE TRANSACTIONS

(75) Inventors: Dean F. Herring, Youngsville, NC (US); John A. Hibbard, Apex, NC (US); Brad M. Johnson, Raleigh, NC (US); John D. Landers, Jr., Raleigh, NC (US); Duane S. Miller, Wake Forest, NC (US); Jeffrey J. Smith, Raleigh, NC (US); David J. Steiner, Raleigh, NC (US); William L. Talley, Wake Forest, NC (US); Jeff D. Thomas, Raleigh, NC (US); Paul M. Wilson, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 328 days.

(21) Appl. No.: 13/329,507

(22) Filed: Dec. 19, 2011

(65) Prior Publication Data
US 2013/0155595 A1    Jun. 20, 2013

(51) Int. Cl.
*G06K 7/08* (2006.01)
*G06F 3/041* (2006.01)

(52) U.S. Cl.
USPC .......................................... 235/449; 345/173

(58) Field of Classification Search
USPC .......................................... 235/449; 345/173
See application file for complete search history.

(56) References Cited

U.S. PATENT DOCUMENTS

| | | |
|---|---|---|
| 5,233,502 A | 8/1993 | Beatty et al. |
| 2002/0181190 A1 | 12/2002 | Callado |
| 2006/0044286 A1* | 3/2006 | Kohlhaas et al. ............. 345/173 |
| 2006/0232565 A1 | 10/2006 | Drevnig |
| 2007/0241184 A1 | 10/2007 | Lum |
| 2009/0250515 A1 | 10/2009 | Todd et al. |

FOREIGN PATENT DOCUMENTS

EP    0 181 196 A2    5/1986

* cited by examiner

*Primary Examiner* — Daniel Hess
(74) *Attorney, Agent, or Firm* — Olive Law Group, PLLC

(57) ABSTRACT

Multi-mode computing systems for point of sale transactions are disclosed. According to an aspect, a computing system includes a first housing and a processing device disposed in the first housing. A user interface and a first input/output interface is integrated with the first housing and in communication with the processing device. The first input/output interface is configured to receive power for delivery to the processing device. A second housing is configured to carry the first housing. An attachment mechanism is configured to selectively attach together the first housing and the second housing for carry of the first housing. A second input/output interface is configured to be communicatively coupled to the first input/output interface when the first housing and the second housing are attached. A power source is connected to the second input/output interface for delivery of power to the processing device via the first input/output interface.

18 Claims, 10 Drawing Sheets

US 8,800,872 B2

MULTI-MODE COMPUTING SYSTEMS FOR POINT OF SALE TRANSACTIONS

BACKGROUND

1. Field of the Invention

The present invention relates to kiosks and point of sale (POS) systems.

2. Description of Related Art

Kiosks and POS systems are specialized computing systems used for sales transactions, inventory tracking, and various other sales-related activities. Examples include electronic cash registers, computerized check-out systems, and self-serve kiosks. Traditionally, kiosks were simply manned sales booths generally located in shopping centers. Today, kiosks and POS systems have become electronically-based, interactive terminals that allow users to conduct business, access the Internet, or link directly to internal business systems. Kiosks and POS systems technology is used for conducting business transactions and interacting with customers, and even conducting internal business operations such as human resource functions.

POS systems often combine computers or POS terminals with cash registers, bar code readers, scanners, and magnetic stripe readers. A POS system may be a standalone machine that processes store transactions and later delivers transaction information to a central computer, or it may be connected to the central computer for real time credit and inventory checks. In addition, POS systems can be a frontline piece of a retailer's information system. The information from the POS system can be shared with other departments and software tools to create one centralized system that can handle accounting, inventory control, merchandising, and forecasting.

Although current kiosk and POS systems provide many features and tools, it is desired to provide improvements to make such systems more versatile and easier to use.

BRIEF SUMMARY

One or more embodiments of the present invention provide multi-mode computing systems for POS transactions. According to an aspect, a computing system includes a first housing and a processing device disposed in the first housing. The computing system also includes a user interface and a first input/output interface integrated with the first housing and in communication with the processing device. The first input/output interface is configured to receive power for delivery to the processing device. Further, the computing system includes a second housing configured to carry the first housing. The computing system also includes an attachment mechanism configured to selectively attach together the first housing and the second housing for carry of the first housing by the second housing. Further, the computing system includes a second input/output interface configured to be communicatively coupled to the first input/output interface when the first housing and the second housing are attached. A power source is integrated into the second housing and connected to the second input/output interface for delivery of power to the processing device via the first input/output interface.

According to another aspect, a computing system includes a first housing and a user interface and a first input/output interface integrated into the first housing. The computing system also includes a second housing configured to carry the first housing. Further, the computing system includes an attachment mechanism configured to selectively attach together the first housing and the second housing for carry of the first housing by the second housing. The computing system also includes a second input/output interface configured to be communicatively coupled to the first input/output interface when the first housing and the second housing are attached. Further, the computing system includes a processing device disposed in the first housing and configured to determine whether the first housing and the second housing are attached. The processing device is also configured to operate in a first user interface mode in response to determining that the first housing and the second housing are attached. Further, the processing device is configured to operate in a second user interface mode in response to determining that the first housing and the second housing are detached.

DETAILED DESCRIPTION

Disclosed herein are POS computing systems configured for operation in multiple modes. Particularly, example computing systems disclosed herein may operate as a kiosk and a POS system, and may include head and base units that are selectively attachable and detachable. A processing device and user interface operable to implement POS functionality may be integrated with a housing of the base unit. The base unit may include a housing for carry of the head unit when attached to the head unit. A suitable attachment mechanism may be used for attaching together the head and base units. A user/output interface may be integrated with the housing of the head unit and may be communicatively connected to the processing device. Further, the input/output interface may be configured for connection to a power source integrated into the housing of the base unit for delivery of power to the processing device. The input/output interface may also be used for communicating data to and from the processing device.

The computing systems in accordance with embodiments of the present disclosure may operate in various modes. In an example, the head and base units may be attached such that the system can rest on a surface and operate in a POS mode. In another example, the head unit may be detached from the base unit and may be used as a kiosk or carried by a user for use in another mode. The processing device may be configured to determine whether the units are attached, and may operate in one user interface mode if the units are attached and in another user interface mode if the units are detached.

Figure 1:
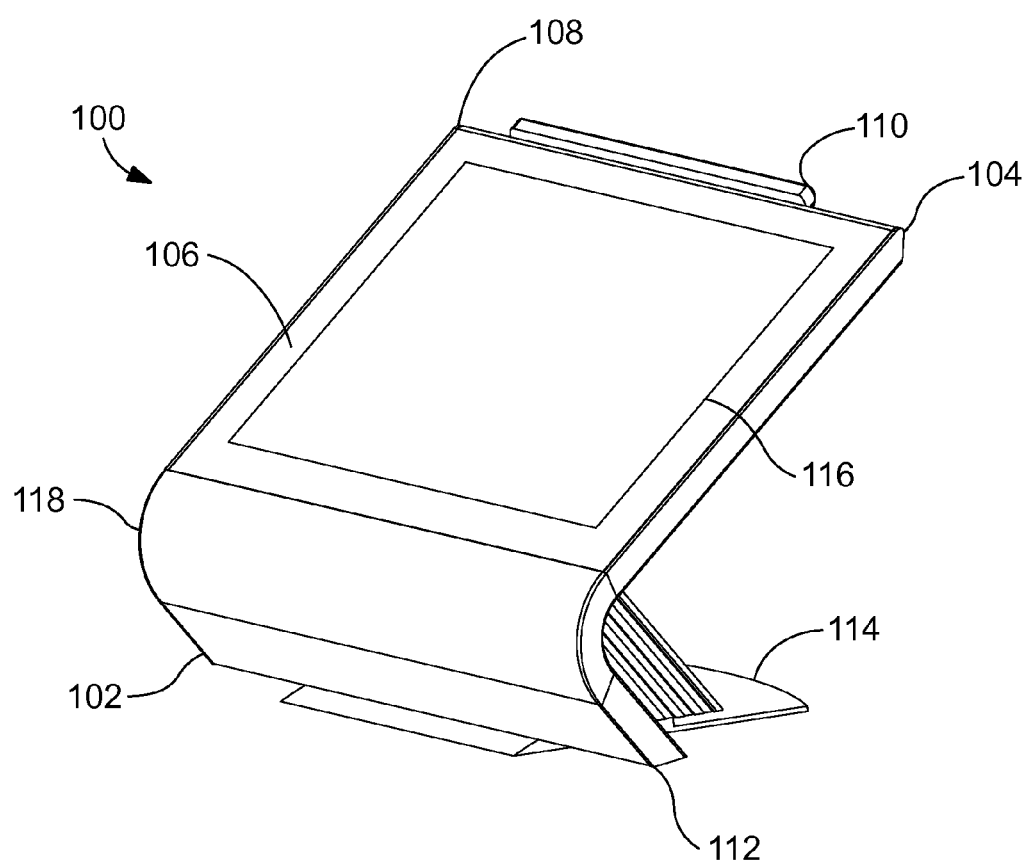
FIG. 1 is a front perspective view of an example computing system having a base unit and detachable head unit in accordance with embodiments of the present disclosure.

FIG. 1 illustrates a front perspective view of an example computing system 100 having a base unit 102 and detachable head unit 104 in accordance with embodiments of the present disclosure. In this example, the base unit 102 and head unit 104 are attached for operation in a POS mode. Referring to FIG. 1, the head unit 104 may include a processing device (not shown) disposed therein. The processing device may include one or more processors (e.g., central processing units) and memory (e.g., hard disk drive), hardware and/or firmware configured to implement one or more POS functions. The POS functions, such as a POS application, may be implemented by a processor executing computer program code stored on memory. A user of the system 100 may operate and interact with the POS application by use of a user interface 106 integrated with a housing 108 of the head unit 104. The user interface 106 in this example is a touchscreen display communicatively connected to the processing device and operable with the POS application. Alternatively, the user interface 106 may be any other suitable type of display, and one or more other user interfaces may be communicatively connected to the processing device and operable with the POS application. For example, a user interface may include a POS component such as, but not limited to, a magnetic stripe reader 110. In another example, the processing device may be connected to one or more other components integrated with the head unit or base unit or apart from the units. These other components may include, but are not limited to, a microphone, a speaker, a display, a printer, and network interface.

The base unit 102 is configured to carry the head unit 104 when the head unit 104 is attached to the base unit 102 as shown in FIG. 1. The base unit 102 includes a housing 112 having a base 114 for support of the system 100 on a surface, such as a top surface of a sales counter. The base unit 102 may include a pivot mechanism configured to support pivot of the head unit 104 in multiple positions with respect to the base unit 102. In this way, a display screen 116 of the user interface 106 may be oriented in a suitable position for viewing by and interaction with a user. The housings 108 and 112 may each be an enclosure that is suitably constructed and made of materials for containing computing components and hardware as described herein.

Figure 2:
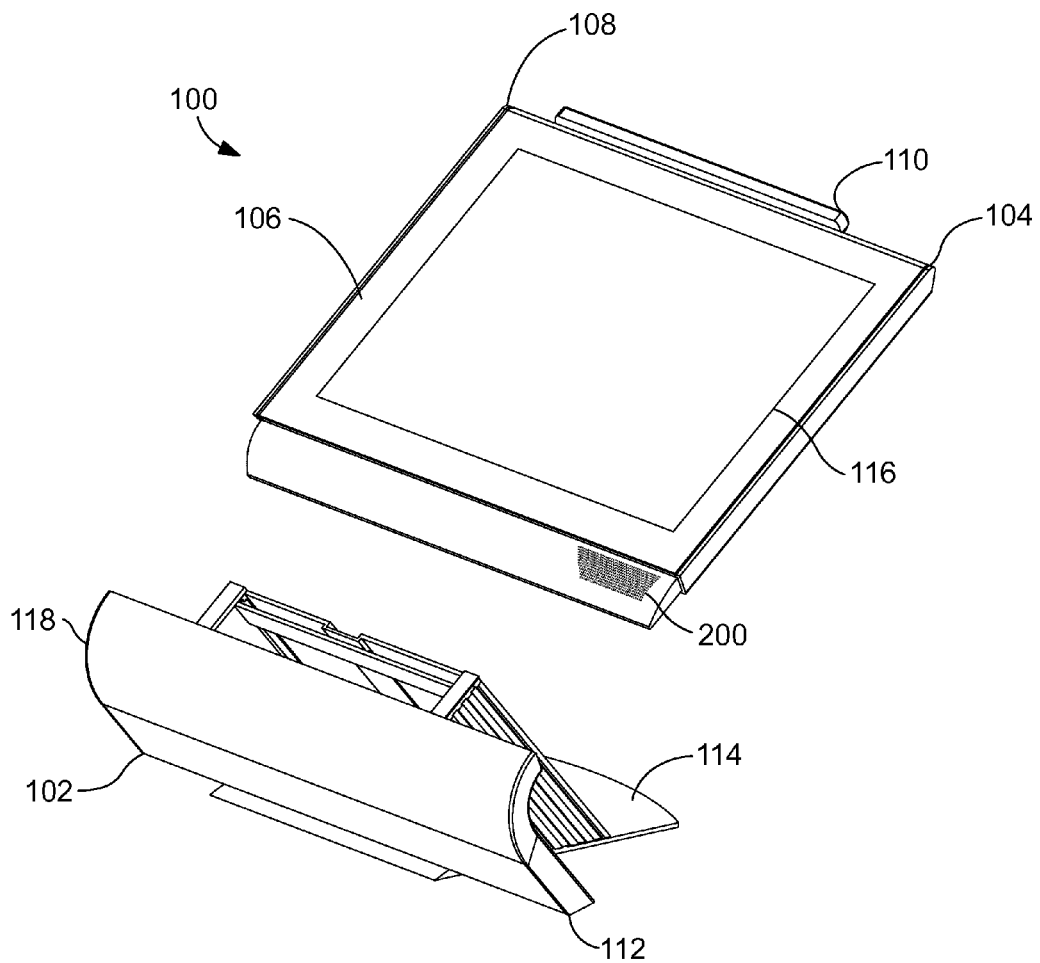
FIG. 2 is a front perspective view of the computing system shown in FIG. 1 in a configuration in which the head unit is detached and spaced from the base unit in accordance with embodiments of the present disclosure.

FIG. 2 illustrates a front perspective view of the computing system 100 shown in FIG. 1 in a configuration in which the head unit 104 is detached and spaced from the base unit 102 in accordance with embodiments of the present disclosure. Referring to FIG. 2, the head unit 104 may be selectively detached by a user as described in further detail herein. When the units 102 and 104 are detached from one another and spaced apart as shown in FIG. 2, a speaker 200 is uncovered for operation. The housing 112 of the base unit 102 includes a cover member 118 positioned such that the cover member 118 covers the speaker 200 when the units 102 and 104 are attached as shown in FIG. 1. The speaker 200 is integrated into the housing 108 and communicatively connected to suitable circuitry for operation of the speaker 102. The processing device disposed in the housing 108 may control the circuitry for operation of the speaker 200. Further, the speaker 200 may be operable with the POS application for appropriate signaling of sales transaction operations. In addition to or alternative to the speaker 200, one or more suitable input/output devices such as, input/output ports, may be integrated into the housing 108 such that the devices are covered by the cover member 118 when the units 102 and 104 are attached. One or more of these input/output devices may be activated by the processing device when the head unit 104 is detached from the base unit 102.

Figure 3:
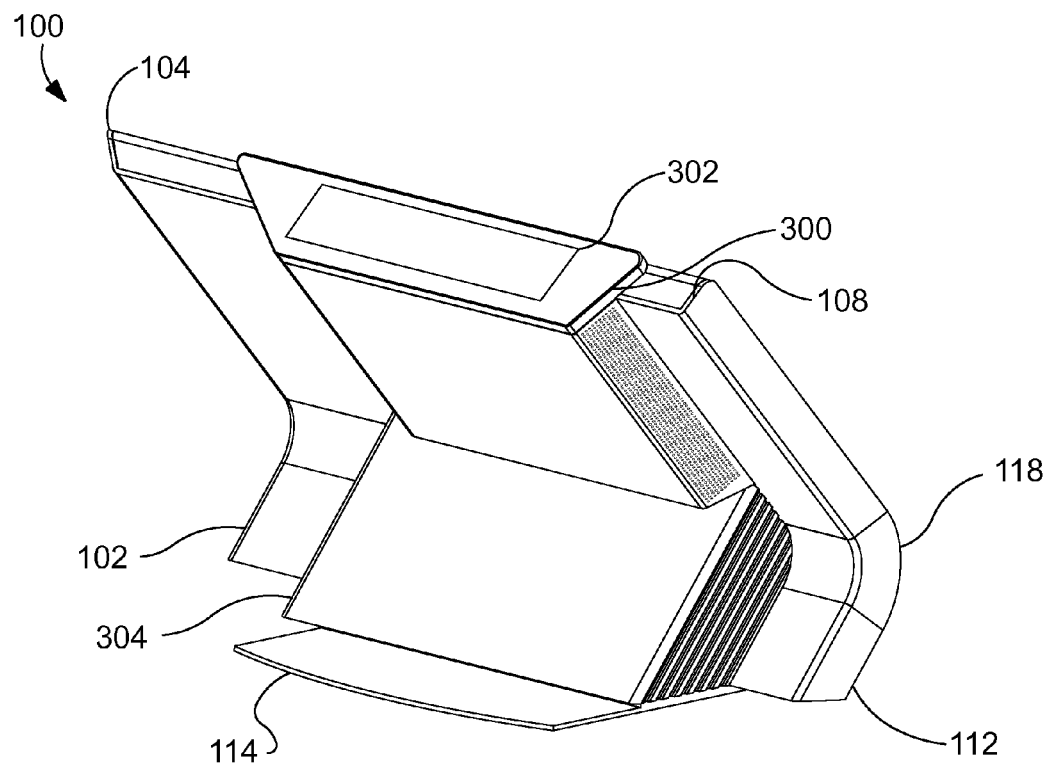
FIG. 3 is a rear perspective view of the computing system shown in FIGS. 1 and 2 in a configuration in which the head unit is attached to the base unit in accordance with embodiments of the present disclosure.

FIG. 3 illustrates a rear perspective view of the computing system 100 shown in FIGS. 1 and 2 in a configuration in which the head unit 104 is attached to the base unit 102 in accordance with embodiments of the present disclosure. Referring to FIG. 3, the system 100 includes another display 300 having a display screen 302. The display 300 is communicatively connected to the processing device, operable with the POS application, and integrated with the housing 108 of the head unit 104. The display screen 302 and the display screen 116 (shown in FIG. 1) are oriented in substantially different directions. The processing unit may control the display screen 302 to display information, such as product price, purchase totals, and other transaction information, to a customer positioned near the display screen 302 and engaged in a POS transaction with a POS attendant. During a POS transaction, the POS attendant may be positioned near an opposing side of the system 100 for interaction with the display screen 116 (shown in FIG. 1).

The system 100 includes another cover member or door 304 mechanically engaged with the attachment mechanism and configured to be positioned in several different positions for initiating detachment of the head unit 104 from the base unit 102 and for allowing a user to access and view an interior defined by the housings 108 and 112. As described in further detail herein, positioned within the interior may be one or more input/output interfaces, such as ports, for communicatively connecting the processing unit of the head unit 104 with electronics of the base unit 102. The input/output interfaces may provide a pathway for communication of data between the processing unit or other components of the head unit 104 and components of the base unit 102. The processing unit of the head unit 104 may be communicatively connected to an input/output interface (not shown) that is integrated with the housing 108. A power source (not shown) is disposed within and integrated with the housing 112 of the base unit 102, and communicatively connected to an input/output interface integrated with the housing 112. The input/output interfaces of the base unit 102 and the head unit 104 may be communicatively coupled together when the units 102 and 104 (or the housings 108 and 112) are attached. When the input/output interfaces are communicatively coupled by attachment of the housings 108 and 112, a pathway for direct delivery of power from the power source to the processing unit is established. As a result, the power source may power the processing unit. Similarly, the power source may be connected with one or more user interfaces, or other electronic components, of the head unit 104 for delivery of power.

Figure 4:
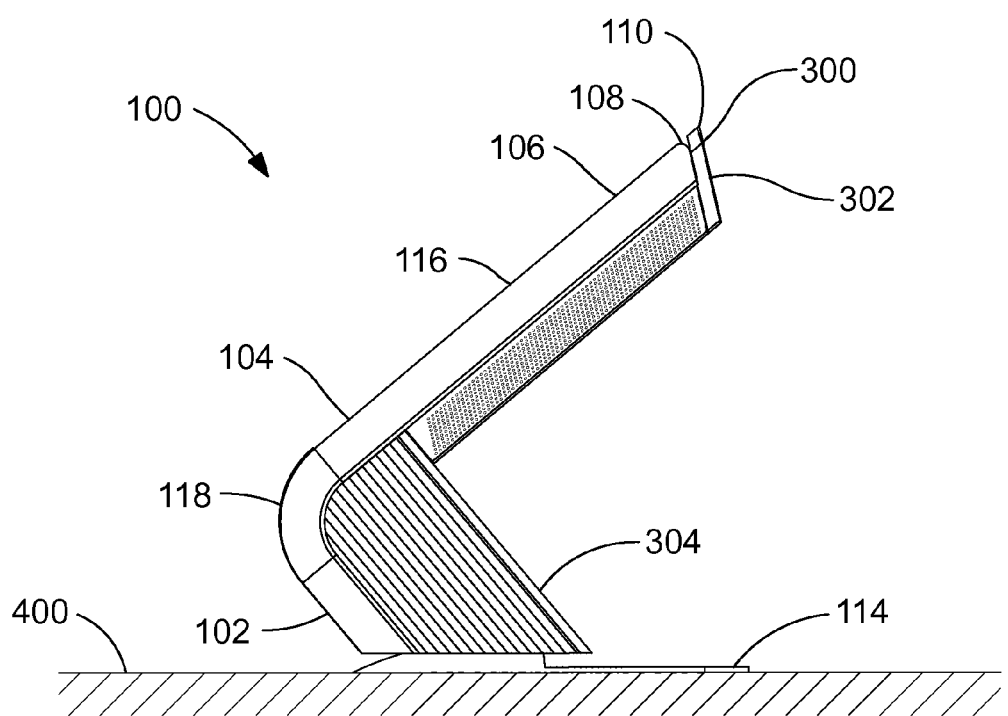
FIG. 4 is a side elevation view of the computing system shown in FIGS. 1, 2, and 3 wherein the head unit is attached to the base unit in accordance with embodiments of the present disclosure.

FIG. 4 illustrates a side elevation view of the computing system 100 shown in FIGS. 1-3 wherein the head unit 104 is attached to the base unit 102 in accordance with embodiments of the present disclosure. Referring to FIG. 4, the system 100 is supported by a surface 400. Particularly, the base 114 is positioned on the surface in an example POS operation mode of the system 100. In this mode, the units 102 and 104 are attached. As described in further detail herein, the processing device may determine that the housings 108 and 112 are attached. In response to determining that the housings 108 and 112 are attached, the POS application may operate in a user interface mode in which a POS transaction may be implemented.

In one or more embodiments of the present disclosure, the processing device may determine that the housings 108 and 112 are attached based on a power delivery source. More particularly for example, the processing device may detect that power is being delivered by the power source located in the base unit 102. In response to this determination, the processing device may determine that the head unit 104 is docked with the base unit 102, thus the processing device may operate in a docked user interface mode or POS operation mode. On the other hand, the processing device may detect that power is being delivered by another power port, and may determine that the head unit 104 is not docked with the base unit 102 in response to this detection. In response to determining that the base unit 102 is undocked, the processing device may operate in a kiosk user interface mode.

In another example, the processing device may determine that power is being delivered by a battery that is internal to the head unit 104. In this example, the processing device may determine that the base unit 102 is undocked in response to determining that power is being delivered from the internal battery. In response to this determination, the processing unit may operate in the kiosk user interface mode or another mode.

In another example, the processing device may determine that the units 102 and 104 are attached (docked) or unattached (undocked) based on a type of communication between the units 102 and 104. For example, the processing device may determine whether the units 102 and 104 are connected by a universal serial bus (USB). In response to this determination, the processing device may determine that the units 102 and 104 are attached (docked) or detached (undocked).

In an example POS operation mode, the units 102 and 104 are detached as shown in FIGS. 2, 3, and 4. In this example mode, the processing device may operate with different functionality than the mode implemented when the units 102 and 104 are attached. For example, a user may use the head unit 104 apart from the base unit 102. This capability may provide the benefit for the user of moving about a retail environment, such as a store, while carrying and interacting with the head unit 104. Further, the processing unit may recognize that the head unit 104 is detached and, in response to the determination, control the enablement of one or more input/output devices or various functions, such as the speaker 200 and POS functions. For example, the speaker 200 may be activated for use now that it is uncovered from the cover member 118. In an example, the speaker 200, one or more other input/output device, and/or one or more functions may be enabled or activated based on detection of a power delivery source as described herein.

Figure 5:
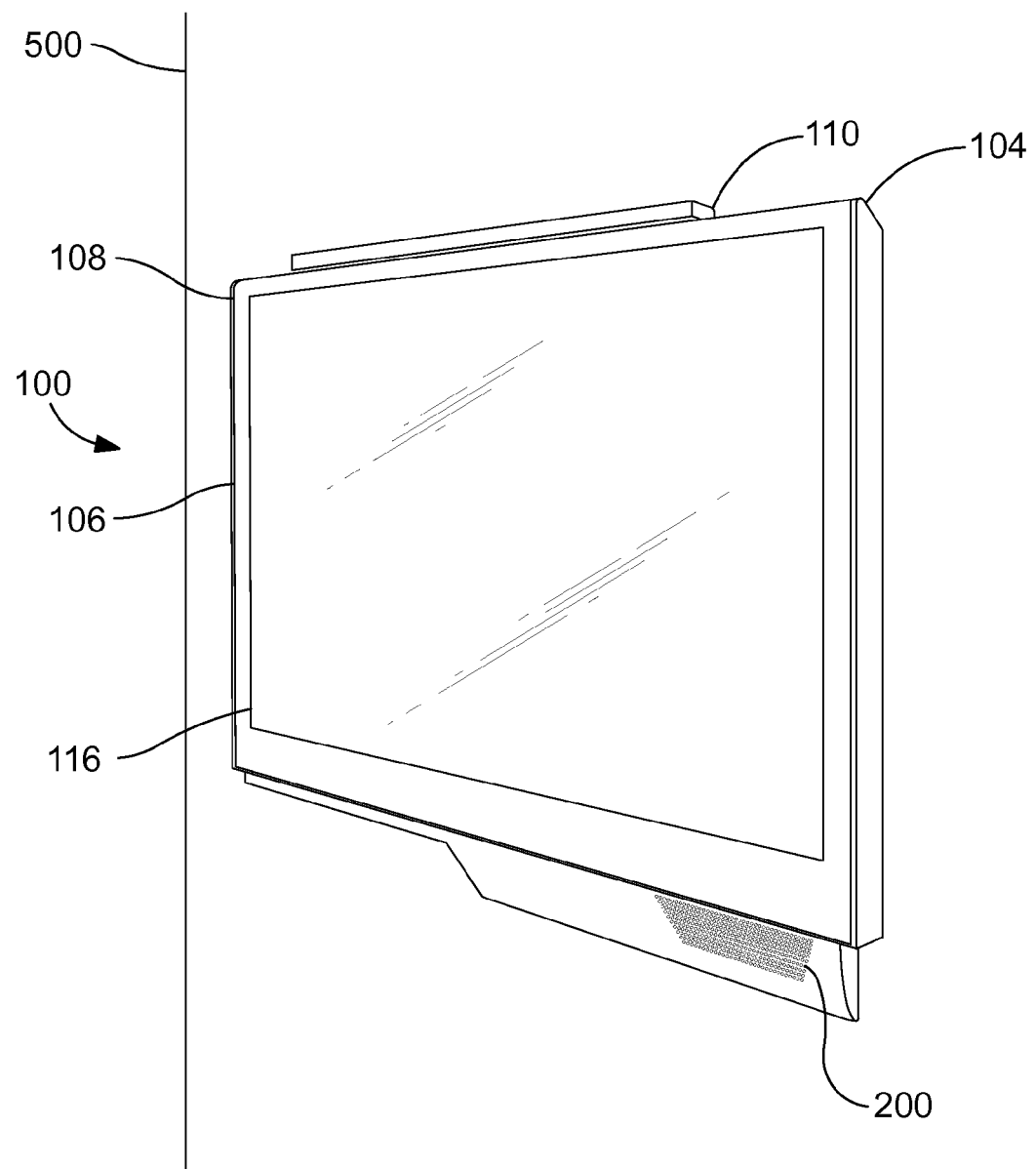
FIG. 5 is a front perspective view of the computing system shown in FIGS. 1, 2, 3, and 4 wherein the head unit is detached from the base unit and attached to a mount in accordance with embodiments of the present disclosure.

In another example, FIG. 5 illustrates a front perspective view of the computing system 100 shown in FIGS. 1, 2, 3, and 4 wherein the head unit 104 is detached from the base unit 102 and attached to a mount in accordance with embodiments of the present disclosure. Referring to FIG. 5, the head unit 104 may be attached to a mount on a wall 500 by an attachment mechanism (not shown) such that the head unit 104 is oriented in a vertical position, or any other suitable position. The attachment mechanism may be positioned on a side of the head unit 104 that opposed the display screen 116. The head unit 104 may operate as a kiosk when the head unit 104 is detached from the base unit 102 and the head unit 104 is attached to a wall or other structure as shown in FIG. 5.

Figure 6:
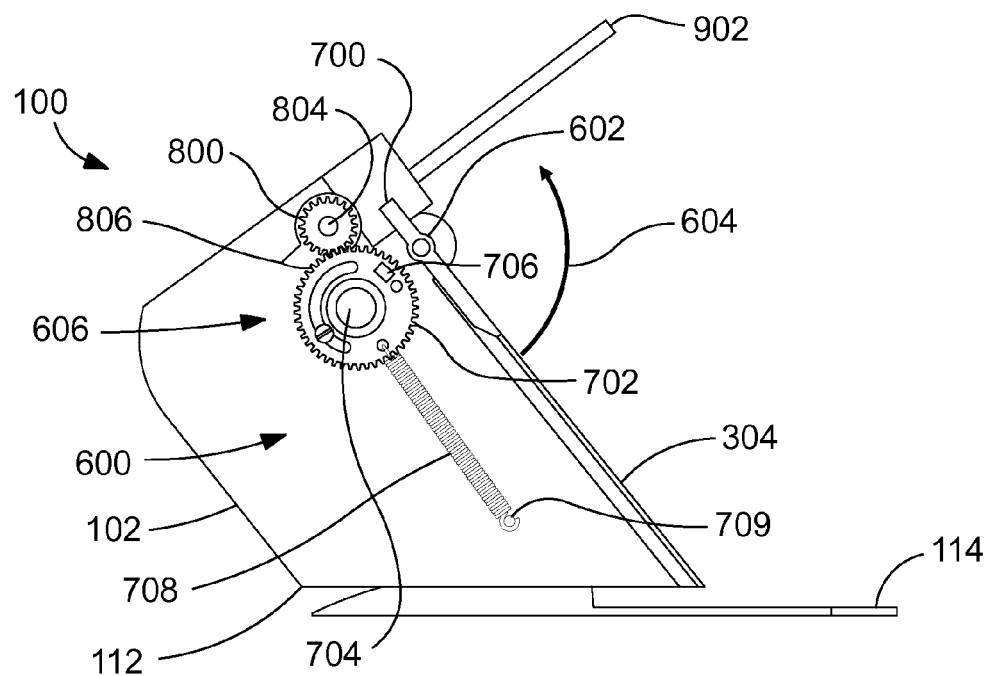
FIG. 6 is a cross-sectional, side elevation view of the computing system shown in FIGS. 1-5 with the door in the closed position in accordance with one or more embodiments of the present disclosure.

FIG. 6 illustrates a cross-sectional, side elevation view of the computing system 100 shown in FIGS. 1-5 with the door 304 in the closed position in accordance with one or more embodiments of the present disclosure. For simplification of this example, the head unit 104 is not shown, but should be understood to be attached to the base unit 102 in this example. Referring to FIG. 6, the door 304 is in the closed position. This position would, for example, prevent people, such as customers, in a retail transaction from viewing the input/output interfaces or other components within an interior 600 defined by the housing 108 (shown in FIGS. 1-5) and housing 112 during POS operation such that the system 100 is visually appealing. The door 304 is attached to a shaft 602 (shown in cross-section across its axis) for rotation about the shaft 602 in a direction indicated by arrow 604.

Figure 7:
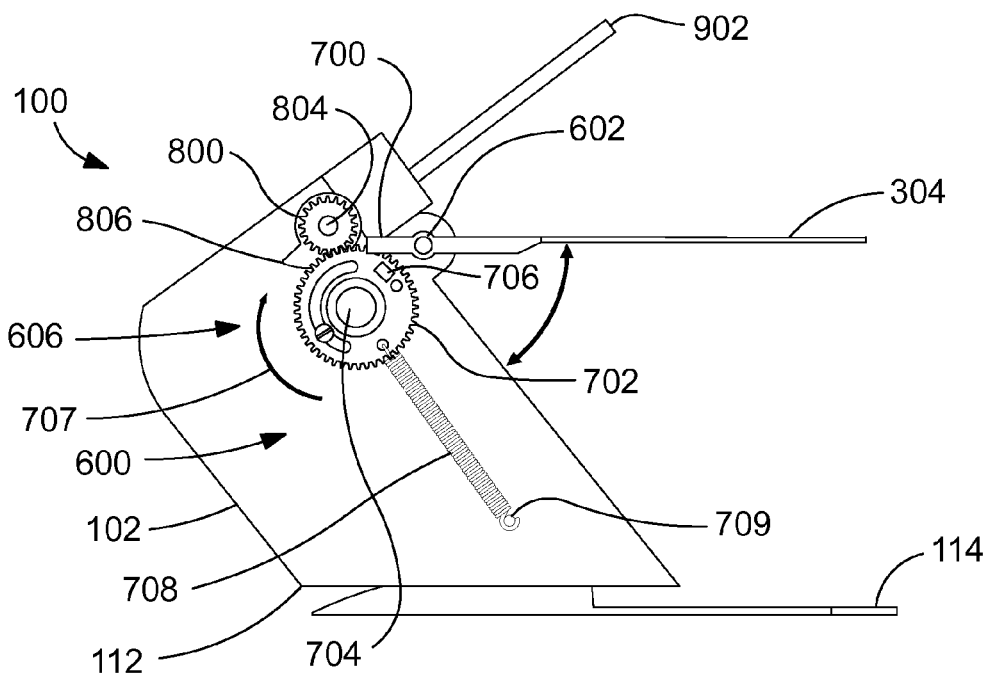
FIG. 7 is a cross-sectional, side elevation view of the computing system shown in FIG. 6 with the door in an open position in accordance with one or more embodiments of the present disclosure.

FIG. 7 illustrates a cross-sectional, side elevation view of the computing system 100 with the door in an open position in accordance with one or more embodiments of the present disclosure. Referring to FIG. 7, the door 304 may be positioned between the closed position shown in FIG. 6 and the open position shown in FIG. 6 for allowing a user to view and interact with components positioned within the interior 600. In this example, the door 304 may rotate approximately 60 degrees between the closed position and the open position shown in FIG. 7.

The process of detachment of the head unit 104 from the base unit 102 may begin when the door 304 is opened and engages the attachment mechanism 606. As shown in FIG. 7, the door 304 includes a member 700 that can engage a gear 702 (shown in cross-section) of the attachment mechanism 606 for rotation of the gear 702 about its axis 704. More particularly, the member 700 of the door 304 initially engages a member 706 of the gear 702 when the door 304 is at the position shown in FIG. 7. In this example, the door 304 has rotated approximately 60 degrees, although the door may rotate any other suitable amount. As the door 304 is opened further, the member 706 moves the member 706 for rotating the gear clockwise about its axis 704 in a direction indicated by direction arrow 706. The gear 702 may be attached to a biasing member 708 for biasing the gear 702 to the position shown FIGS. 6 and 7 and resisting rotation of the gear 702. In this example, the biasing member 708 is a spring having one end attached to the gear 702 and its other end attached to a member 708 of the housing 112.

Figure 8:
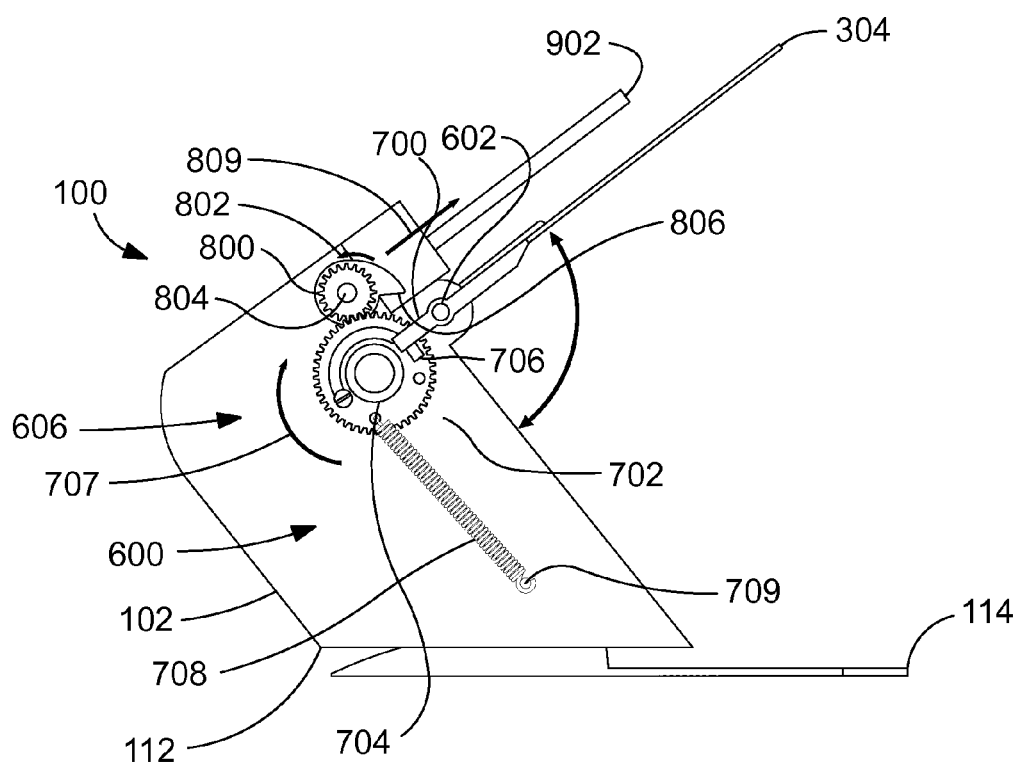
FIG. 8 is a cross-sectional, side elevation view of the computing system shown in FIGS. 6 and 7 with the door in a fully open position in accordance with one or more embodiments of the present disclosure.

FIG. 8 illustrates a cross-sectional, side elevation view of the computing system 100 with the door 304 in a fully open position in accordance with one or more embodiments of the present disclosure. In this fully opened position, the door 304 has rotated approximately 80 degrees from the closed position, although the door may rotate any other suitable amount. The gear 706 is rotationally engaged with another gear 800 such that movement of the gear 706 in one rotational direction 707 causes the gear 800 to move in an opposing rotational direction indicated by direction arrow 802 about a shaft 804 (shown in cross-section across its axis). Thus, when the gear 800 rotates, the shaft 804 also rotates. The gear 800 is biased to rotate in a direction that opposes the direction 802 due to the biasing member 708.

Figure 9:
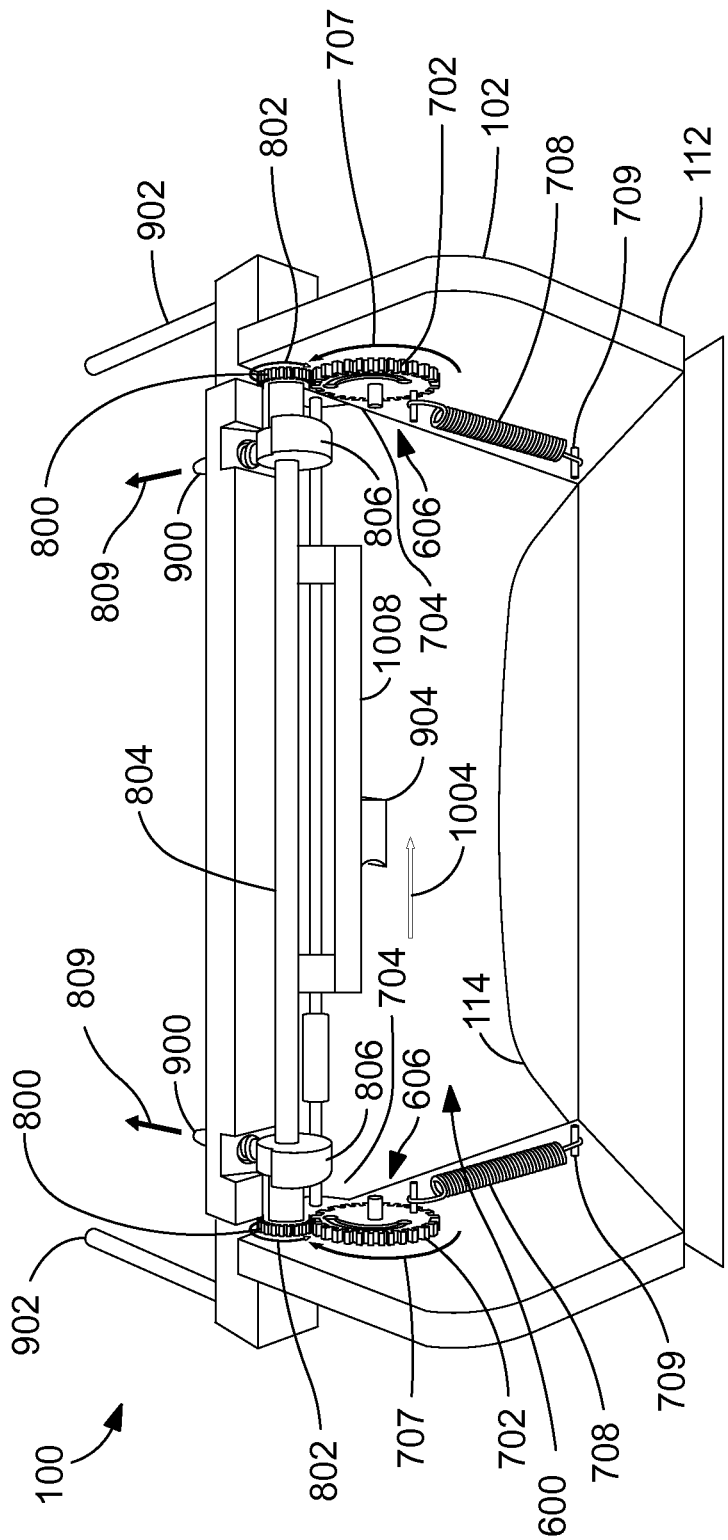
FIG. 9 is a front perspective view of the interior of the computing system shown in FIGS. 6-8 in accordance with embodiments of the present disclosure.

The attachment mechanism 606 may include a cam 806 attached to the shaft 804 for rotation along with the gear 800. Referring to FIGS. 6 and 7, the cam 806 is shown in an initial position. When the gear 800 rotates in the direction 802, the cam 806 also rotates in the direction 802 about the axis of the shaft 804 to transform the rotary motion into a linear motion in a direction indicated by arrow 808 for movement of a pin 900 shown in FIG. 9, which illustrates a front perspective view of the interior 600 of the computing system 100 in accordance with embodiments of the present disclosure. Referring to FIG. 9, it is shown that the computing system 100 includes another attachment mechanism 606 positioned on an opposing side of the base unit 102.

An outside surface of each cam 602 engages a respective pin 900. As the gears 800 rotate in the direction 808, the cams 602 also rotate in the direction 808 such that the cams 602 move their respective pins 900 in the direction 808 for moving the head unit 104 in the same direction. More particularly, an end of each pin 900 that opposes the respective cam 602 engages a portion of the head unit 104 or housing 108 such that the head unit 104 moves in the direction 808 when the pin 900 moves in the same direction.

The base unit 102 may include guides 902 for assisting a user with attachment and detachment of the head unit 104. The guides 902 may fit into apertures defined by the head unit 104. Further, the guides 902 may provide support to the head unit 104 during attachment and while the system 100 is in the configuration depicted in FIG. 1.

Figure 10:
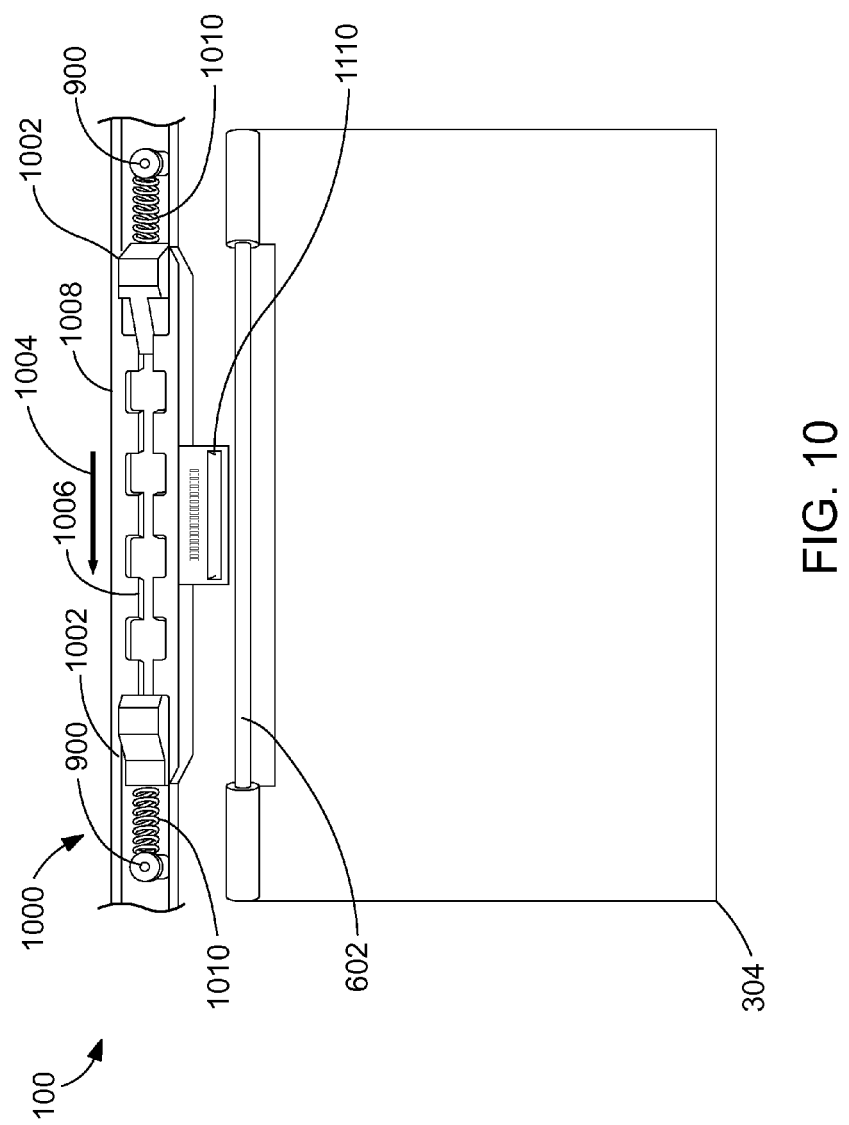
FIG. 10 is a top perspective view of the door and an attachment mechanism of the computing system shown in FIGS. 6-9 in accordance with embodiments of the present disclosure.

FIG. 10 illustrates a top perspective view of the door 304 and an attachment mechanism 1000 of the computing system 100 in accordance with embodiments of the present disclosure. Referring to FIG. 10, the attachment mechanism 1000 includes a pair of latches 1002 that may be moved from the depicted position in a direction indicated by direction arrow 1004. The movement of the latches 1002 along the direction 1004 may be guided by a groove 1006 defined within a casing 1008 of the base unit. Biasing members 1010 may bias the latches 1002 to the position shown in FIG. 10 and resist movement of the latches 1002 in the direction 1004.

The latches 1002 may securely attach the base unit to the head unit. More particularly, the head unit 104 or housing 108 shown in FIG. 1 may define apertures corresponding to the latches 1002 for accepting the latches 1002 and for allowing the latches 1002 to grip to the head unit 104. When moved along the guides 902 shown in FIG. 9 for attachment to the base unit, the head unit may reach and interface with the latches 1002 such that the latches 1002 slide in the direction 1004 and then retract to grip the head unit when the head unit is in position as shown in FIG. 1. To detach the head unit, a lever 904 shown in FIG. 9 and attached to the latches 1002 may be moved in the direction 1004 for release of the head unit by the latches 1002.

Figure 11:
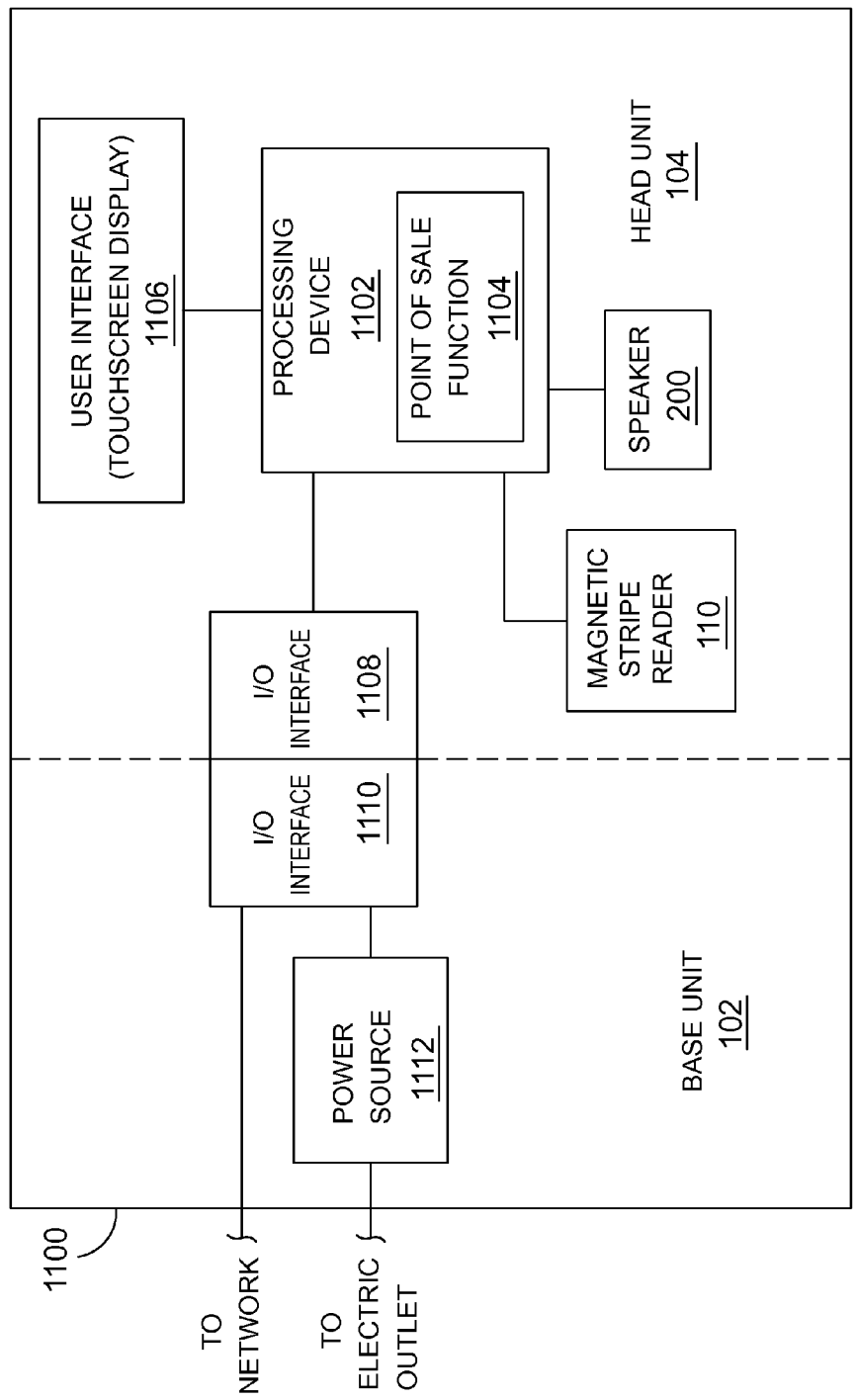
FIG. 11 is a block diagram of example electronic components of a computing system in accordance with embodiments of the present disclosure.

FIG. 11 illustrates a block diagram of example electronic components of a computing system 1100 in accordance with embodiments of the present disclosure. Referring to FIG. 11, the head unit 104 includes a processing device 1102 configured to implement a POS function 1104 and to control a user interface 1106, the speaker 200, and the magnetic stripe reader 110. In this example, the user interface 1106 is a touchscreen display. The processing device 1102 may also control or otherwise interact with other components that are integrated with and/or apart from the head unit 104. The head unit 104 may also include an input/output interface 1108 configured to connect to an input/output interface 1110 of the base unit. The interfaces 1108 and 1110 may be attachable to and detachable from one another for communicatively connecting components of the units 102 and 104. FIG. 10 shows an example input/output interface 1110 positioned for interfacing with an input/output interface of a head unit when the units are attached.

The base unit 102 includes a power source 1112 configured for connection to the input/output interface 1110 for direct delivery of power to the processing device 1102 via the input/output interface 1108 when the base unit 102 and head unit 104 are attached. The power source 1112 may be similarly connected to other components (e.g., the magnetic stripe reader 110, the user interface 1106, and the user interface 1106) of the head unit 104 for delivery of power. The power source 1112 may be a rechargeable battery that is connectable to an electrical outlet.

The processing device 1102 and other components of the head unit 104 may be communicatively connected to a server or other electrical device via the interfaces 1108 and 1110. For example, the processing device 1102 may connect to a network server via the interfaces 1108 and 1110 when the head unit 102 and the base unit 104 are attached.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to diagrams of apparatus (systems) and computer program products according to embodiments of the invention. For example, aspects of the present invention are described with reference to the diagrams shown in the Figures. It will be understood that each block of the diagrams, and combinations of blocks in the diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams illustration, and combinations of blocks in the block diagrams illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computing system comprising:
a first housing;
a processing device disposed in the first housing;
a user interface and a first input/output interface integrated with the first housing and in communication with the processing device, the first input/output interface configured to receive power for delivery to the processing device;
a second housing configured to carry the first housing;
an attachment mechanism configured to selectively attach together the first housing and the second housing for carry of the first housing by the second housing;
a second input/output interface configured to be communicatively coupled to the first input/output interface when the first housing and the second housing are attached;
a power source integrated into the second housing and connected to the second input/output interface for delivery of power to the processing device via the first input/output interface;
wherein the second housing comprises a cover member mechanically engaged with the attachment mechanism, and configured to be positioned in either a first position or a second position;
wherein in the first position, the cover member interacts with the attachment mechanism to detach the first housing from the second housing; and
wherein in the second position, the cover member covers the first and second input/output interfaces.

2. The computing system of claim 1, wherein the user interface includes a display.

3. The computing system of claim 2, wherein the display is a touchscreen display.

4. The computing system of claim 1, wherein the user interface includes a point of sale device.

5. The computing system of claim 4, wherein the point of sale device comprises one of a magnetic stripe reader and a display.

6. The computing system of claim 1, wherein the user interface comprises a first display including a first display screen,
   wherein the computing system comprises a second display integrated with the first housing, the second display including a second display screen, and
   wherein the first and second display screens are oriented in substantially different directions.

7. The computing system of claim 1, further comprising an input/output device integrated into the first housing, and
   wherein the cover member is positioned to cover the input/output device when the first housing and the second housing are attached.

8. The computing device of claim 7, wherein the processing device is configured to:
   determine that the first housing and the second housing are attached; and
   disable the input/output device in response to determining that the first housing and the second housing are attached.

9. The computing device of claim 7, wherein the processing device is configured to:
   determine that the first housing and the second housing are detached; and
   enable the input/output device in response to determining that the first housing and the second housing are detached.

10. The computing device of claim 7, wherein the input/output device is a speaker.

11. The computing device of claim 1, wherein the second housing defines an opening for access to the first and second input/output interfaces,
    wherein the cover member covers the opening in the second position, and
    wherein the cover member is configured to be positioned in a third position such that the cover partially covers the opening.

12. The computing system of claim 1, wherein the processing device comprises a memory disposed in the first housing and configured to store data.

13. The computing system of claim 12, wherein the processing device is configured to implement a point of sale function.

14. The computing system of claim 1, wherein the processing device is configured to:
    determine whether the first housing and the second housing are attached;
    operate in a first user interface mode when the first housing and the second housing are attached; and
    operate in a second user interface mode when the first housing and the second housing are detached.

15. The computing system of claim 1, wherein the attachment mechanism is a first attachment mechanism configured for attachment of a first portion of the first housing to the second housing, and
    wherein the computing system further comprises a second attachment mechanism configured to attach a second portion of the first housing to a mount.

16. The computing system of claim 1, wherein the first input/output interface is configured to attach to another power source for delivery of power to the processing device when the first housing and the second housing are detached.

17. The computing system of claim 1, further comprising one or more guides configured to position the first and second housings with respect to one another for attachment of the first housing to the second housing.

18. The computing system of claim 1, wherein the second housing comprises a base for support of the second housing on a surface,
    wherein the computing system further comprises a pivot mechanism configured to support pivot of the second housing in a plurality of positions with respect to the first housing.

* * * * *